(12) United States Patent
Watanabe et al.

(10) Patent No.: US 11,284,232 B2
(45) Date of Patent: Mar. 22, 2022

(54) VEHICLE CONTROL SYSTEM

(71) Applicant: HONDA MOTOR CO., LTD., Tokyo (JP)

(72) Inventors: Masahito Watanabe, Wako (JP); Kazuhiro Matsuoka, Wako (JP); Nobuharu Karasawa, Wako (JP); Nobumasa Toyoshima, Wako (JP); Atsushi Takahashi, Wako (JP); Kenichi Shimizu, Wako (JP); Akira Saita, Wako (JP); Hideyuki Sako, Kawasaki (JP); Hiroyuki Hayashi, Kawasaki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 136 days.

(21) Appl. No.: 16/814,086

(22) Filed: Mar. 10, 2020

(65) Prior Publication Data

US 2020/0314610 A1    Oct. 1, 2020

(30) Foreign Application Priority Data

Mar. 26, 2019  (JP) .............................. JP2019-057744

(51) Int. Cl.
*H04W 4/40* (2018.01)
*B60R 16/023* (2006.01)
(Continued)

(52) U.S. Cl.
CPC ............ *H04W 4/40* (2018.02); *B60R 16/023* (2013.01); *G07C 5/008* (2013.01); *H04W 4/80* (2018.02)

(58) Field of Classification Search
CPC ............... G06N 5/022; G06F 17/5009; B60W 60/0016; H04W 76/30; H04W 88/08; H04W 48/20; H04W 28/0268; H04W 4/40
See application file for complete search history.

(56) References Cited

U.S. PATENT DOCUMENTS

| 2019/0037034 A1* | 1/2019 | Lee ....................... H04L 67/125 |
| 2019/0082016 A1* | 3/2019 | Sasaki ................... H04L 12/407 |
| 2020/0073391 A1* | 3/2020 | Zhang ...................... G05D 1/02 |

FOREIGN PATENT DOCUMENTS

| JP | 2005-529424 A | 9/2005 |
| JP | 2006-067154 | 3/2006 |

(Continued)

OTHER PUBLICATIONS

Japanese Office Action dated Oct. 27, 2020, with English translation, 9 pages.

*Primary Examiner* — Iqbal Zaidi
(74) *Attorney, Agent, or Firm* — Rankin, Hill & Clark LLP

(57) ABSTRACT

A vehicle control system includes: a vehicle near field communication unit that communicates via a near field communication path; a vehicle network communication unit that communicates via a global communication path; a control ECU; a transmission control unit that transmits control commands received by the vehicle near field communication unit and the vehicle network communication unit to the control ECU that controls actions of the vehicle; and a control command detection unit that detects whether or not there are a plurality of same control commands received within a prescribed time. When the control command detection unit detects a plurality of control commands received within the prescribed time, the transmission control unit transmits the control commands in order according to a (Continued)

prescribed priority order, and the control ECU processes the control commands received from the transmission control unit in a received order to control the actions of the vehicle.

3 Claims, 8 Drawing Sheets

(51) Int. Cl.
*H04W 4/80* (2018.01)
*G07C 5/00* (2006.01)

(56) References Cited

FOREIGN PATENT DOCUMENTS

| JP | 2008-205913 A | 9/2008 |
| JP | 2009-089286 A | 4/2009 |
| JP | 2011-220037 A | 11/2011 |

* cited by examiner

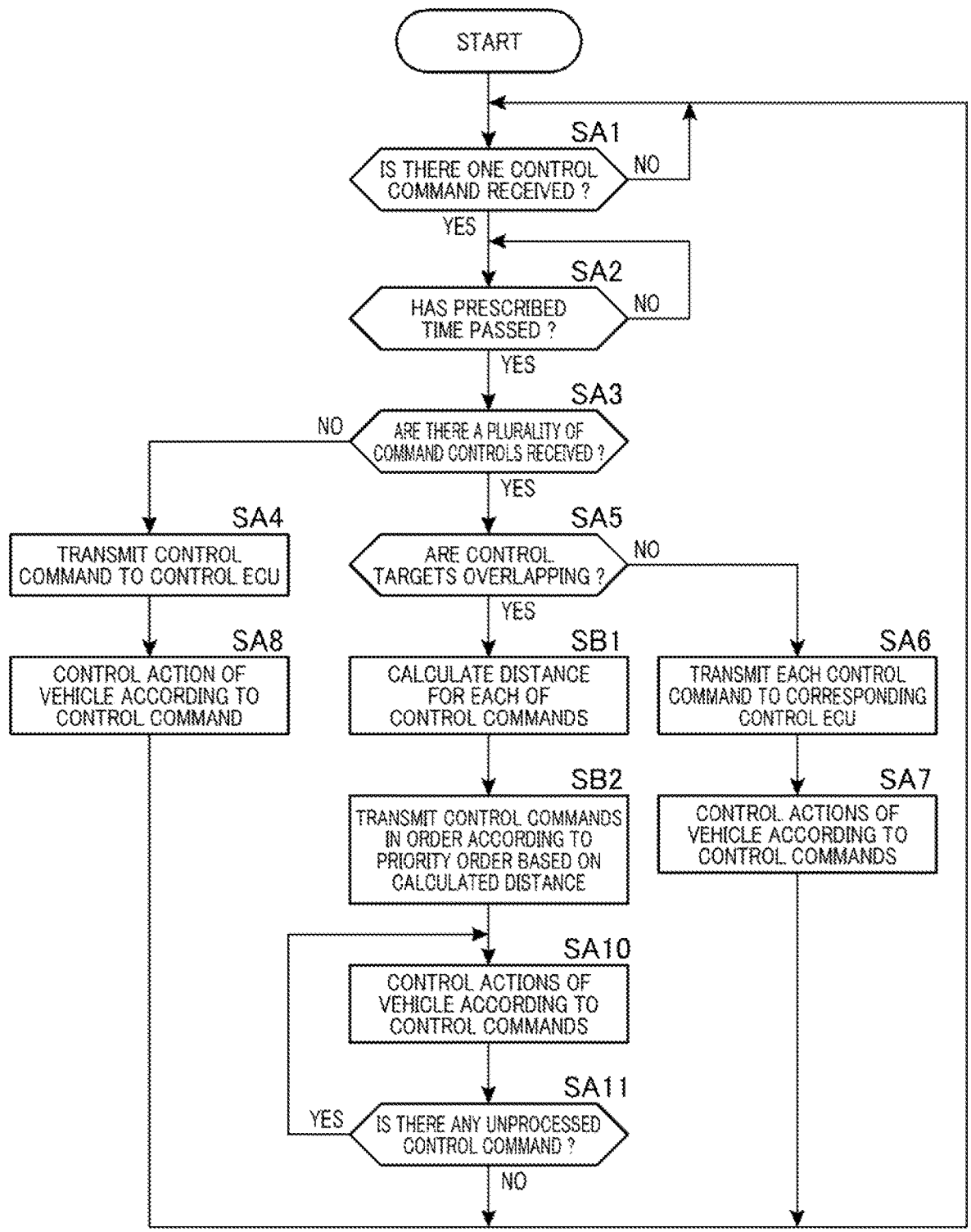

VEHICLE CONTROL SYSTEM

INCORPORATION BY REFERENCE

The present application claims priority under 35 U.S.C. § 119 to Japanese Patent Application No. 2019-057744 filed on Mar. 26, 2019. The content of the applications is incorporated herein by reference in its entirety.

BACKGROUND OF THE INVENTION

Field of the Invention

The present invention relates to a vehicle control system.

Description of the Related Art

Conventionally, there have been various kinds of proposals for avoiding conflict in controls of actions of a vehicle. For example, Patent Literature 1 discloses a system which, when a communication period of keyless communication overlaps with a communication period of smart communication, stops the keyless communication until the communication period of the smart communication ends so that there is no conflict in controls of actions of electric components provided in a vehicle.

CITATION LIST

Patent Literature
Patent Literature 1: Japanese Patent Laid-Open No. 2006-67154

However, with the configuration such as that of Patent literature 1 that stops execution of one of controls that may conflict with the other, there may often require an action for suspending or invalidating the control that may conflict, an action for providing a notification that the control is suspended or invalidated, and the like. Therefore, actions for avoiding the conflict in controls may become complicated, thereby increasing the processing load.

The present invention is designed in view of the aforementioned circumstance, and it is an object of the present invention to avoid conflict in controls of actions in a vehicle by execution of a simple action.

SUMMARY OF THE INVENTION

An aspect for achieving the object is a vehicle control system that includes: a first communication unit that communicates with a first mobile terminal via a first communication path; a second communication unit that communicates with a second mobile terminal via a second communication path; a vehicle control unit that controls an action of a vehicle; a transmission control unit that transmits control commands received by the first communication unit and the second communication unit to the vehicle control unit; and a control command detection unit that detects whether or not there are a plurality of the control commands for a same control target received within a prescribed time, wherein, when the control command detection unit detects that a plurality of the control commands are received within the prescribed time, the transmission control unit transmits the control commands to the vehicle control unit in order according to a prescribed priority order, and the vehicle control unit processes the control commands received from the transmission control unit in a received order to control the action of the vehicle.

The vehicle control system may include a third communication unit that communicates with a display apparatus provided in the vehicle via a third communication path, and the transmission control unit may be configured to transmit the control commands received by the third communication unit to the vehicle control unit in order according to the prescribed priority order.

In the vehicle control system, the transmission control unit may be configured to transmit, to the vehicle control unit, the control command received by the communication unit whose communicable distance from the vehicle is the longest, on a priority basis.

The vehicle control system may include a positional information detection unit that detects positional information included in the control commands, and the transmission control unit may be configured to transmit, to the vehicle control unit, the control command having the positional information that shows the longest distance with respect to the position of the vehicle, on a priority basis.

In the vehicle control system, communication via the first communication path is near field communication, communication via the second communication path is communication via a public circuit, and communication via the third communication path is communication via an in-vehicle network provided in the vehicle.

According to the aspect of the present invention, it is possible to avoid conflict in controls of actions of a vehicle by execution of a simple operation.

BRIEF DESCRIPTION OF THE DRAWINGS

FIG. 8 is a flowchart showing actions of a vehicle control apparatus.

DETAILED DESCRIPTION OF THE PREFERRED EMBODIMENTS

1. First Embodiment

[1-1. Configuration of Remote Control System]

Figure 1:
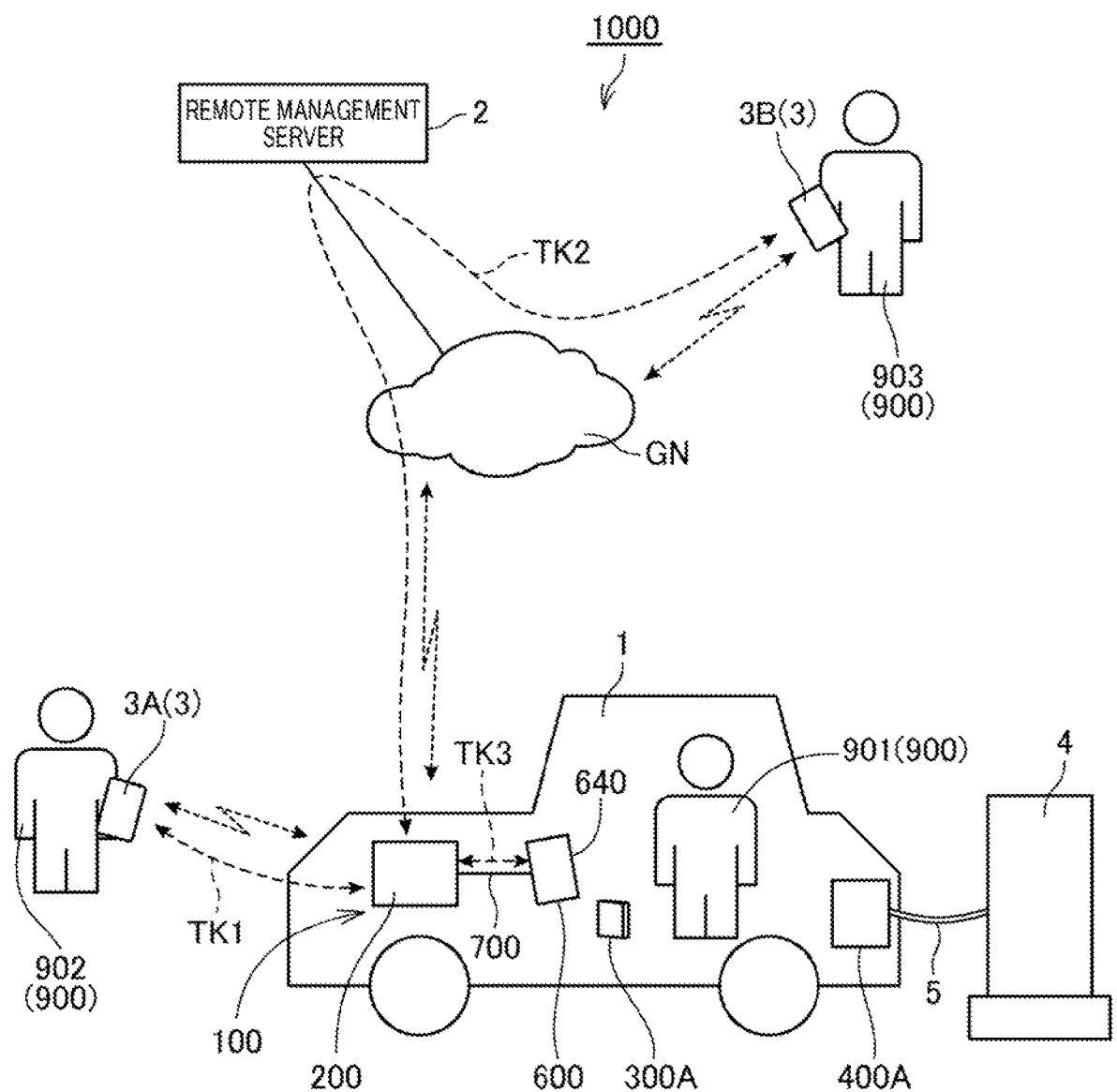
FIG. 1 is a diagram showing a configuration of a vehicle control system according to a first embodiment.

FIG. 1 is a diagram showing a configuration of a remote control system 1000.

The remote control system 1000 is a system capable of controlling actions of a vehicle 1 when a user 900 operates an application execution apparatus 600 provided to the vehicle 1 or when the user 900 operates a mobile terminal 3. In the embodiment, an action of an air conditioner (hereinafter, referred to as "car air conditioner" and denoted as "300A") as an electric component of the vehicle 1 and a charging action for a storage cell 400A are described as actions of the vehicle 1. The application execution apparatus 600 corresponds to an example of a display apparatus (display).

The remote control system 1000 is configured with the vehicle 1, a remote management server 2 that is connected to be communicable with the vehicle 1 via a global network GN, and the mobile terminal 3 carried by the user 900. The global network GN is a network including the Internet, a telephone network, and other communication networks, and corresponds to "public network" of the present invention.

The vehicle 1 is an electromotive vehicle that operates having a storage cell 400A as a power source. Note that the vehicle 1 is a mobile body temporarily or continuously managed or used by the user 900, and may be a vehicle owned by the user 900 or may be a vehicle provided to the user 900 by car sharing, car rental, car lease, or the like. There is no limit set for the specific mode of the vehicle 1, and the vehicle 1 may be a manually drivable vehicle that can be run by manual drive by operations conducted by a driver regarding the drive thereof, or may be an automatically drivable vehicle that can automatically run without operations conducted by the driver regarding the drive thereof. Further, the vehicle 1 may also be a vehicle other than a four-wheeled vehicle.

The vehicle 1 in FIG. 1 is connected to an external charging apparatus 4 via a cable 5, and is in a state chargeable to the storage cell 400A.

The vehicle 1 includes an in-vehicle system 100 that includes a vehicle control apparatus 200 and the application execution apparatus 600. The vehicle control apparatus 200 and the application execution apparatus 600 are connected to an in-vehicle network 700 that is CAN, for example, to be interactively communicable via a communication path (hereinafter, referred to as "in-vehicle communication path" and denoted as "TK3") established by the in-vehicle network 700. The in-vehicle communication path TK3 corresponds to "third communication path" of the present invention.

Details of the vehicle control apparatus 200 will be described later.

The application execution apparatus 600 is an apparatus that provides various kinds of functions to the user 900 riding on the vehicle 1 by executing an installed application program (hereinafter, referred to as "app"), and an example thereof may be a display audio apparatus including an audio reproducing function and the like.

The application execution apparatus 600 includes a vehicle touch panel 640 to be described later. The application execution apparatus 600 provides a user interface for receiving operations for controlling actions of the vehicle 1 to the user 900 riding on the vehicle 1 via the vehicle touch panel 640 with a function of an action control app 6200 to be described later. In the embodiment, the application execution apparatus 600 provides the user interface for controlling the actions of the car air conditioner 300A and charging actions of the storage cell 400A to the user 900 riding on the vehicle 1. Examples of controls of the actions of the car air conditioner 300A may be the control for starting the car air conditioner 300A, the control for stopping the car air conditioner 300A, and the control for changing set temperatures. Further, examples of the controls of the charging actions of the storage cell 400A may be the control for starting charging at a certain time and the control for stopping charging at a certain time.

Note that the application execution apparatus 600 is provided at a position where the user 900 riding on the vehicle 1 can visually recognize and operate the vehicle touch panel 640. An example of such position may be a dashboard of the vehicle 1.

Upon receiving a control of the action of the car air conditioner 300A according to an operation on the user interface provided by the vehicle touch panel 640, the application execution apparatus 600 transmits a control command corresponding to the received control to the vehicle control apparatus 200 via the in-vehicle network 700. For example, in a case where a control for changing the set temperature of the car air conditioner 300A to "25° C." is received via the user interface, the application execution apparatus 600 transmits a control command to change the set temperature of the car air conditioner 300A to "25° C." to the vehicle control apparatus 200. The vehicle control apparatus 200 outputs the received control command to an air conditioner ECU 300.

Further, upon receiving a control of the charging action for the storage cell 400A according to an operation for the user interface provided by the vehicle touch panel 640, the application execution apparatus 600 transmits a control command corresponding to the received control to the vehicle control apparatus 200 via the in-vehicle network 700. For example, in a case where a control for starting charging of the storage cell 400A is received via the user interface, the application execution apparatus 600 transmits a control command to start charging of the storage cell 400A to the vehicle control apparatus 200. The vehicle apparatus 200 outputs the received control command to the charging ECU 400.

By having communication between the application execution apparatus 600 and the vehicle control apparatus 200 via the in-vehicle communication path TK3 as described above, the user 900 riding on the vehicle 1 can control the action of the car air conditioner 300A and the charging action for the storage cell 400A by operating the user interface provided on the vehicle touch panel 640.

With the remote control system 1000, the user 900 can remotely control the action of the car air conditioner 300A and the charging action for the storage cell 400A by using the mobile terminal 3 other than by operating the user interface provided on the vehicle touch panel 640.

The mobile terminal 3 has an app (hereinafter, referred to as "remote app" and denoted as "310") for enabling remote operations installed in advance, and remotely controls the actions of the car air conditioner 300A and the charging action for the storage cell 400A by a function of the remote app 310. The mobile terminal 3 can remotely control the actions of the car air conditioner 300A and the charging action for the storage cell 400A via two kinds of communication paths.

That is, the mobile terminal 3 remotely controls the vehicle 1 via a communication path (hereinafter, referred to as a near field communication path, and denoted as "TK1") established between the vehicle 1 and the mobile terminal 3 according to a prescribed near field communication standard such as Bluetooth®, for example. Further, the mobile terminal 3 remotely controls the vehicle 1 via a remote management server 2 by a communication path (hereinafter, referred to as a global communication path, and denoted as "TK2") established by the global network GN. The near field communication path TK1 corresponds to "first communication path" of the present invention. Further, the global communication path TK2 corresponds to "second communication path" of the present invention.

The mobile terminal 3 provides the user interface for receiving operations for controlling the actions of the car air conditioner 300A and the charging action for the storage cell 400A to the user 900 by a terminal touch panel 35 with a function of the remote app 310 installed in advance.

Upon receiving a control for the action of the car air conditioner 300A according to an operation for the user interface provided by the terminal touch panel 35, the mobile terminal 3 transmits a control command corresponding to the received control to the vehicle control apparatus 200 of the vehicle 1 via the global communication path TK2 or the near field communication path TK1. The vehicle control apparatus 200 outputs the received control command to the air conditioner ECU 300. Further, upon receiving a control for the charging action for the storage cell 400A according to an operation for the user interface provided by the terminal touch panel 35, the mobile terminal 3 transmits a control command corresponding to the received control to the vehicle control apparatus 200 of the vehicle 1 via the global communication path TK2 or the near field communication path TK1. The vehicle control apparatus 200 outputs the received control command to a charging ECU 400.

By having communication between the mobile terminal 3 and the vehicle control apparatus 200 via the global communication path TK2 or the near field communication path TK1 as described above, the user 900 can remotely control the actions of the car air conditioner 300A and the charging action for the storage cell 400A by operating the mobile terminal 3.

FIG. 1 shows a case where three users 900 control the actions of the vehicle 1. That is, the user 901 is riding on the vehicle 1 and controls the actions of the vehicle 1 via the application execution apparatus 600. Further, the user 902 uses a mobile terminal 3A to communicate with the vehicle 1 via the near field communication path TK1, and controls the actions of the vehicle 1 by operating the mobile terminal 3A. Further, the user 903 uses a mobile terminal 3B to communicate with the vehicle 1 via the global communication path TK2, and controls the actions of the vehicle 1 by operating the mobile terminal 3B. The mobile terminal 3A corresponds to "first mobile terminal" of the present invention. Further, the mobile terminal 3B corresponds to "second mobile terminal" of the present invention.

[1-2. Configuration of Mobile Terminal]

Next, the mobile terminal 3 will be described.

Figure 2:
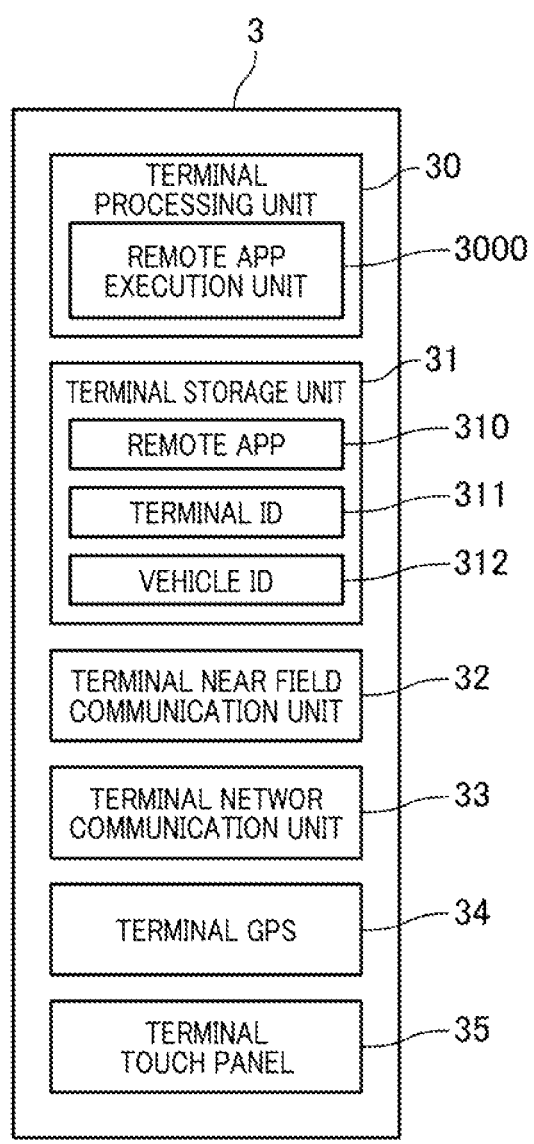
FIG. 2 is a block diagram showing a configuration of a mobile terminal.

FIG. 2 is a block diagram showing the configuration of the mobile terminal 3.

The mobile terminal 3 includes a terminal processing unit 30, a terminal storage unit 31, a terminal near field communication unit 32 (terminal near field receiver/transmitter), a terminal network communication unit 33 (terminal network receiver/transmitter), a terminal GPS 34, and the terminal touch panel 35.

The terminal processing unit 30 is a computer including a processor such as a CPU (Central Processing Unit), for example. The terminal storage unit 31 is connected to the terminal processing unit 30. The terminal storage unit 31 stores a control program that is a computer program executed by the terminal processing unit 30 and various kinds of data processed by the terminal processing unit 30 to be able to be read by the terminal processing unit 30.

There is no specific limit set for the mode of hardware configuring the terminal processing unit 30 and the terminal storage unit 31. For example, the terminal processing unit 30 may be configured with a single processor. Further, the terminal processing unit 30 may be an integrated device configured with a processor, a ROM (Read Only Memory), a RAM (Random Access Memory), and the like. The terminal storage unit 31 may be configured with a nonvolatile memory that stores programs and data in a nonvolatile manner and, specifically, may include a magnetic storage device such as a hard disc and a semiconductor memory device such as a flash ROM. Further, the terminal storage unit 31 may include a volatile memory that temporarily stores programs, data, and the like to be executed by the terminal processing unit 30. Furthermore, the terminal processing unit 30 and the terminal storage unit 31 may also be an integrated single device.

The terminal processing unit 30 includes a remote app execution unit 3000 as a functional element or a functional unit. The functional element is achieved by reading out and executing the remote app 310 stored in the terminal storage unit 31 by the terminal processing unit 30 as the computer.

The terminal processing unit 30 controls each unit of the mobile terminal 3 based on the data stored in the terminal storage unit 31 by executing the programs stored in the terminal storage unit 31.

The terminal storage unit 31 stores the remote app 310, a terminal ID 311, and a vehicle ID 312. The remote app 310 is an app for using a remote control service provided by the remote management server 2, and installed in advance in the mobile terminal 3. The terminal ID 311 is identification information for identifying the mobile terminal 3 when using the remote control service. When a registration for using the remote control service is confirmed with the remote management server 2, the terminal ID 311 is allotted by the remote management server 2. The vehicle ID 312 is identification information for identifying the vehicle 1 that is to be remotely controlled in the remote control service.

The terminal near field communication unit 32 is configured with communication hardware that performs near field communication according to the near field communication standard such as Bluetooth. The terminal near field communication unit 32 establishes the near field communication path TK1 with the vehicle 1 according to the control of the terminal processing unit 30, and has near field communication with the vehicle 1.

The terminal network communication unit 33 is configured with communication hardware according to a prescribed communication standard, and communicates with the remote management server 2 via the global network GN by the control of the terminal processing unit 30.

The terminal GPS (Global Positioning System) 34 is a processing unit that receives GPS signals from a GPS satellite via an antenna, not shown, and calculates the position of the mobile terminal 3 based on the received GPS signals. The terminal GPS 34 generates terminal position data indicating the position of the mobile terminal 3 and outputs to the terminal processing unit 30. The terminal position data corresponds to "positional information" of the present invention.

The terminal touch panel 35 includes a display panel such as a liquid crystal display panel and a touch sensor that is superposed on the display panel or integrally provided. The display panel displays various kinds of images by the control of the terminal processing unit 30. The touch sensor detects touch operations and outputs to the terminal processing unit 30. The terminal processing unit 30 executes processing corresponding to the touch operations according to input made via the touch sensor.

[1-2-1. Remote App Execution Unit]

The remote app execution unit 3000 displays the user interface for receiving operations for controlling the action of the car air conditioner 300A and the charging action for the storage cell 400A on the terminal touch panel 35. Upon receiving the control for the action of the car air conditioner 300A according to the operation on the user interface, the remote app execution unit 3000 generates a control command corresponding to the received control. Further, upon receiving the control for the charging action for the storage cell 400A according to the operation on the user interface, the remote app execution unit 3000 generates a control command corresponding to the received control.

The control command generated by the remote app execution unit 3000 is a data group in which the terminal ID 311 stored in the terminal storage unit 31, the vehicle ID 312 stored in the terminal storage unit 31, control target data showing the control target, and control content data showing control contents are associated. For example, in a case where the control for changing the set temperature of the car air conditioner 300A to "25° C." is received via the user interface, the remote app execution unit 3000 generates a control command in which the terminal ID 311, the vehicle ID 312, the control target data indicating the car air conditioner 300A, and the control content data indicating to change the set temperature to "25° C." are associated.

After generating the control command, the remote app execution unit 3000 transmits the generated control command to the vehicle 1 via the terminal near field communication unit 32 when the near field communication path TK1 is established between the mobile terminal 3 and the vehicle 1. Meanwhile, when the near field communication path TK1 is not established between the mobile terminal 3 and the vehicle 1, the remote app execution unit 3000 transmits the generated control command to the remote management server 2 via the terminal network communication unit 33.

[1-3. Remote Management Server]

Next, the remote management server 2 will be described.

The remote management server 2 is a server apparatus for performing management regarding remote control of the vehicle 1. Even though the remote management server 2 is expressed by a single block in each drawing, it does not necessarily mean that the remote management server 2 is configured with a single server apparatus.

Figure 3:
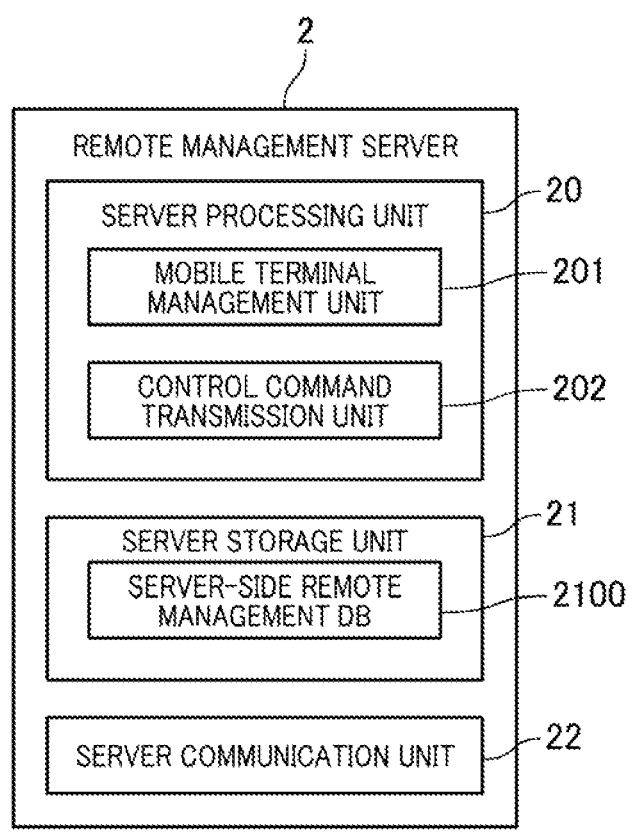
FIG. 3 is block diagram showing a configuration of a remote management server.

FIG. 3 is a block diagram showing the configuration of the remote management server 2. As shown in FIG. 3, the remote management server 2 includes a server processing unit 20, a server storage unit 21, and a server communication unit 22.

The server processing unit 20 is a computer including a processor such as a central processing unit (CPU), for example. The server storage unit 21 is connected to the server processing unit 20. The server storage unit 21 stores a control program that is a computer program executed by the server processing unit 20 and various kinds of data processed by the server processing unit 20 to be able to be read by the server processing unit 20.

There is no specific limit set for the mode of hardware configuring the server processing unit 20 and the server storage unit 21. For example, the server processing unit 20 may be configured with a single processor. Further, the server processing unit 20 may be an integrated device configured with a processor, a read only memory (ROM), a random access memory (RAM), and the like. The server storage unit 21 may be configured with a nonvolatile memory that stores programs and data in a nonvolatile manner and, specifically, may include a magnetic storage device such as a hard disc and a semiconductor memory device such as a flash ROM. Further, the server storage unit 21 may include a volatile memory that temporarily stores programs, data, and the like executed by the server processing unit 20. Furthermore, the server processing unit 20 and the server storage unit 21 may also be an integrated single device.

The server processing unit 20 includes a mobile terminal management unit 201 and a control command transmission unit 202 as functional elements or functional units. Those functional elements are achieved by executing the control program stored in the server storage unit 21 by the server processing unit 20 as the computer.

Note that the control program to be executed by the server processing unit 20 can be stored in any computer readable storage media. Instead, the whole or a part of the functional elements of the server processing unit 20 can also be configured with hardware each including one or more electronic circuit component.

The server processing unit 20 controls each unit of the remote management server 2 according to the data stored in the server storage unit 21 by executing the program stored in the server storage unit 21.

The server storage unit 21 stores a server-side remote management DB 2100.

Figure 4:
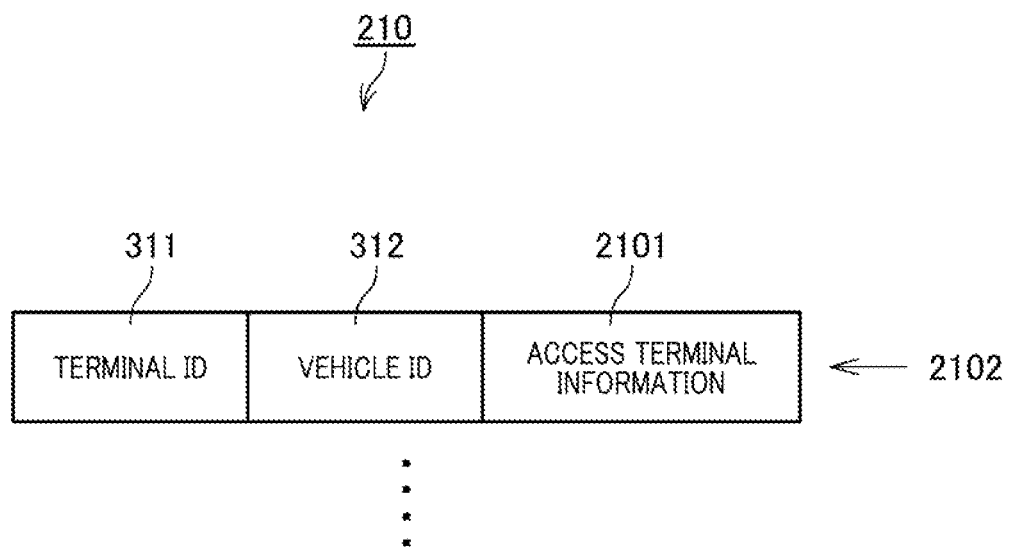
FIG. 4 is a diagram showing an example of a server-side remote management DB.

FIG. 4 is a diagram showing an example of the server-side remote management DB 2100.

The server-side remote management DB 2100 is a database that stores a plurality of pieces of terminal management information 2102 in which the terminal ID 311, the vehicle ID 312, and an access terminal information for accessing to the mobile terminal are associated for each of the mobile terminals 3 registered to use the remote control service.

The server communication unit 22 is configured with communication hardware according to a prescribed communication standard, and communicates with the vehicle 1 and the mobile terminal 3 via the global network GN by the control of the server processing unit 20.

[1-3-1. Mobile Terminal Management Unit]

Upon receiving a registration request for using the remote control service from the mobile terminal 3, the mobile terminal management unit 201 makes a request for approving the use registration to the person authorized to give the approval thereof by a prescribed method. When the registration is approved, the mobile terminal management unit 201 generates the terminal ID 311. Then, the mobile terminal management unit 201 generates the terminal management information 2102 by associating the generated terminal ID 311 with the access terminal information 2101 and the vehicle ID 312 included in the use registration request received from the mobile terminal 3, and stores to the server-side remote management DB 2100. Thereby, the server processing unit 20 registers the mobile terminal 3 that uses the remote control service to the server-side remote management DB 2100. When the terminal management information 2102 is registered to the server-side remote management DB 2100, the mobile terminal management unit 201 transmits the terminal ID 311 to the mobile terminal 3 as a registration completion notification based on the acquired access terminal information 2101. Thereby, the terminal ID 311 is allotted to the mobile terminal 3.

[1-3-2. Control Command Transmission Unit]

When the control command from the mobile terminal 3 is received via the server communication unit 22, the control command transmission unit 202 acquires a combination of the terminal ID 311 and the vehicle ID 312 from the received control command. Then, the control command transmission unit 202 determines whether or not the terminal management information 2102 including the acquired combination is stored in the server-side remote management DB 2100. When determining that the terminal management information 2102 including the acquired combination is stored in the server-side remote management DB 2100, the control command transmission unit 202 transmits the control command received from the mobile terminal 3 to the vehicle 1 indicated by the vehicle ID 312 of the combination via the server communication unit 22.

[1-4. Configuration of In-Vehicle System]

Next, the configuration of the in-vehicle system 100 of the vehicle 1 will be described.

Figure 5:
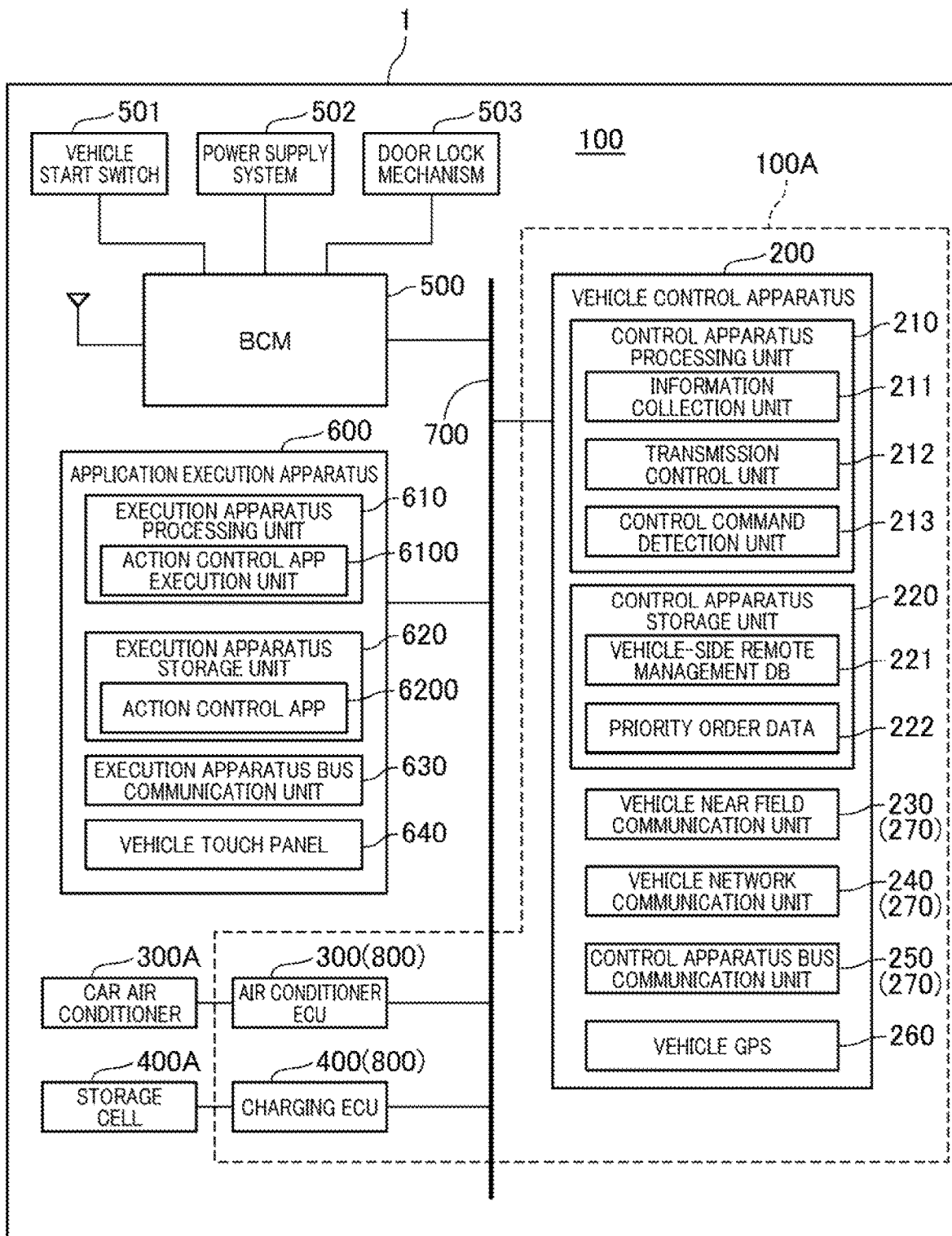
FIG. 5 is block diagram showing a configuration of an in-vehicle system.

FIG. 5 is a diagram showing the configuration of the in-vehicle system 100 of the vehicle 1. The in-vehicle system 100 includes the vehicle control apparatus 200 that is an electronic control unit (ECU), the air conditioner ECU 300, the charging ECU 400, a body control module (BCM) 500, and the application execution apparatus 600. The air conditioner ECU 300 and the charging ECU 400 correspond to "vehicle control unit" of the present invention. In the following explanation, the air conditioner ECU 300 and the charging ECU 400, when not specifically distinguished, are generally termed as "control ECU" and denoted as "800". The vehicle control apparatus 200 together with at least one of the air conditioner ECU 300 and the charging ECU 400 configures a vehicle control system 100A.

The vehicle control apparatus 200, the air conditioner ECU 300, the charging ECU 400, the BCM 500, and the application execution apparatus 600 are connected via the in-vehicle network 700 to be mutually communicable. Note here that the in-vehicle network 700 is a CAN bus according to a controller area network (CAN) communication standard, for example.

[1-4-1. BCM]

The BCM 500 communicates with an FOB key held by the owner of the vehicle 1 to detect existence of the FOB key. Upon detecting the FOB key or when receiving a notification indicating that an electronic key is valid from a communication apparatus, not shown, via the in-vehicle network 700, the BCM 500 determines that the valid electronic key exists inside or in the surroundings of the vehicle 1. On condition that the valid electronic key exists inside or in the surroundings of the vehicle 1, the BCM 500 detects an operation of a vehicle start switch 501 done by the user 900 and controls on/off of a power supply system 502 that supplies the power to a drive motor and the like, not shown, of the vehicle 1.

Further, when an instruction to lock or unlock the door of the vehicle 1 is received from the FOB key or when such instruction is received from a communication apparatus, not shown, via the in-vehicle network 700, the BCM 500 gives an instruction to a door lock mechanism 503 to lock or unlock the door.

[1-4-2. Application Execution Apparatus]

The application execution apparatus 600 includes an execution apparatus processing unit 610, an execution apparatus storage unit 620, an execution apparatus bus communication unit 630, and the vehicle touch panel 640.

The execution apparatus processing unit 610 is a computer including a processor such as a central processing unit (CPU), for example. The execution apparatus storage unit 620 is connected to the execution apparatus processing unit 610. The execution apparatus storage unit 620 stores a control program that is a computer program executed by the execution apparatus processing unit 610 and various kinds of data processed by the execution apparatus processing unit 610 to be able to be read by the execution apparatus processing unit 610.

There is no specific limit set for the mode of hardware configuring the execution apparatus processing unit 610 and the execution apparatus storage unit 620. For example, the execution apparatus processing unit 610 may be configured with a single processor. Further, the execution apparatus processing unit 610 may be an integrated device configured with a processor, a ROM, a RAM, and the like. The execution apparatus storage unit 620 may be configured with a nonvolatile memory that stores programs and data in a nonvolatile manner and, specifically, may include a magnetic storage device such as a hard disc and a semiconductor memory device such as a flash ROM. Further, the execution apparatus storage unit 620 may include a volatile memory that temporarily stores programs, data, and the like executed by the execution apparatus processing unit 610. Furthermore, the execution apparatus processing unit 610 and the execution apparatus storage unit 620 may also be an integrated single device.

The execution apparatus processing unit 610 includes an action control app execution unit 6100 as a functional element or a functional unit. The functional element is achieved by reading out and executing an action control app 6200 stored in the execution apparatus storage unit 620 by the execution apparatus processing unit 610 as the computer.

The execution apparatus processing unit 610 controls each unit of the application execution apparatus 600 according to the data stored in the execution apparatus storage unit 620 by executing the program stored in the execution apparatus storage unit 620.

The execution apparatus storage unit 620 stores the action control app 6200. The action control app 6200 is an app for controlling the actions of the car air conditioner 300A and the charging action for the storage cell 400A, and installed in advance to the application execution apparatus 600.

The execution apparatus bus communication unit 630 is configured with a CAN transceiver that communicates with other apparatuses via the in-vehicle network 700 that is a CAN, for example, and communicates with each apparatus connected to the in-vehicle network 700.

The vehicle touch panel 640 includes a display panel such as a liquid crystal display panel and a touch sensor that is superposed on the display panel or integrally provided. The display panel displays various kinds of images by the control of the execution apparatus processing unit 610. The touch sensor detects touch operations and outputs to the execution apparatus processing unit 610. The execution apparatus processing unit 610 executes processing corresponding to the touch operations according to input made via the touch sensor.

While employed in the embodiment is a configuration with which the operation input of the user 900 is received via the vehicle touch panel 640, the configuration for receiving the operation input is not limited thereto but may also be a configuration with which the operation input is mechanically received by a member such as a lever or a switch.

[1-4-2-1. Action App Execution Unit]

The action control app execution unit 6100 displays the user interface for receiving operations for controlling the actions of the car air conditioner 300A and the charging action for the storage cell 400A on the vehicle touch panel 640. Upon receiving the control for the action of the car air conditioner 300A according to the operation on the user interface, the action control app execution unit 6100 generates a control command corresponding to the received control. Further, upon receiving the control for the charging action for the storage cell 400A according to the operation on the user interface, the action control app execution unit 6100 generates a control command corresponding to the received control.

The control command generated by the action control app execution unit 6100 is a data group in which control target data showing the control target and control content data showing control contents are associated.

After generating the control command, the action control app execution unit 6100 transmits the generated control command to the vehicle control apparatus 200 via the execution apparatus bus communication unit 630.

[1-4-3. Vehicle Control Apparatus]

The vehicle control apparatus 200 includes a control apparatus processing unit 210, a control apparatus storage unit 220, a vehicle near field communication unit 230 (vehicle near field receiver/transmitter), a vehicle network communication unit 240 (vehicle network receiver/transmitter), a control apparatus bus communication unit 250, and a vehicle GPS 260. The vehicle near field communication unit 230 corresponds to "first communication unit" of the present invention. Further, the vehicle network communication unit 240 corresponds to "second communication unit" of the present invention. Further, the control apparatus bus communication unit 250 corresponds to "third communication unit" of the present invention.

In the following explanation, the vehicle near field communication unit 230, a vehicle network communication unit 240 and the control apparatus bus communication unit 250, when not specifically distinguished, are denoted as "270" and generally termed as a "communication unit" in a simple manner.

The control apparatus processing unit 210 is a computer including a processor such as a CPU, for example. The control apparatus storage unit 220 is connected to the control apparatus processing unit 210. The control apparatus storage unit 220 stores a control program that is a computer program executed by the control apparatus processing unit 210 and various kinds of data processed by the control apparatus processing unit 210 to be able to be read by the control apparatus processing unit 210.

There is no specific limit set for the mode of hardware configuring the control apparatus processing unit 210 and the control apparatus storage unit 220. For example, the control apparatus processing unit 210 may be configured with a single processor. Further, the control apparatus processing unit 210 may be an integrated device configured with a processor, a ROM, a RAM, and the like. The control apparatus storage unit 220 may be configured with a nonvolatile memory that stores programs and data in a nonvolatile manner and, specifically, may include a magnetic storage device such as a hard disc and a semiconductor memory device such as a flash ROM. Further, the control apparatus storage unit 220 may include a volatile memory that temporarily stores programs, data, and the like executed by the control apparatus processing unit 210. Furthermore, the control apparatus processing unit 210 and the control apparatus storage unit 220 may also be an integrated single device.

The control apparatus processing unit 210 includes an information collection unit 211, a transmission control unit 212, and a control command detection unit 213 as functional elements or functional units. Those functional elements are achieved by executing the control program stored in the control apparatus storage unit 220 by the control apparatus processing unit 210 as the computer.

Note that the control program executed by the control apparatus processing unit 210 can be stored in any computer readable storage media. Instead, the whole or a part of the functional elements of the control apparatus processing unit 210 can also be configured with hardware each including one or more electronic circuit component.

The control apparatus processing unit 210 controls each unit of the vehicle control apparatus 200 according to the data stored in the control apparatus storage unit 220 by executing the program stored in the control apparatus storage unit 220.

The control apparatus storage unit 220 stores vehicle-side remote management DB 221 and priority order data 222. The vehicle-side remote management DB 221 is a database in which the server-side remote management DB 2100 of the remote management server 2 is regularly downloaded by the control apparatus processing unit 210. The priority order data 222 will be described later.

The vehicle near field communication unit 230 is configured with communication hardware that performs near field communication according to the near field communication standard such as Bluetooth. The vehicle near field communication unit 230 establishes the near field communication path TK1 with the mobile terminal 3 existing inside or in the surroundings of the vehicle 1 to have near field communication with the mobile terminal 3.

The vehicle network communication unit 240 is configured with communication hardware according to a prescribed communication standard, and communicates with the remote management server 2 via the global network GN by the control of the control apparatus processing unit 210.

The control apparatus bus communication unit 250 is configured with a CAN transceiver that communicates with other apparatuses such as the BCM 500 via the in-vehicle network 700, for example, and communicates with each apparatus connected to the in-vehicle network 700 according to the control of the control apparatus processing unit 210.

The vehicle GPS 260 is a processing unit that receives GPS signals from the GPS satellite via an antenna, not shown, and calculates the position of the vehicle 1 based on the received GPS signals. The vehicle GPS 260 generates vehicle position data indicating the position of the vehicle 1 and outputs to the control apparatus processing unit 210.

[1-4-3-1. Information Collection Unit]

The information collection unit 211 communicates with the remote management server 2 via the vehicle network communication unit 240 at a prescribed interval, and downloads the contents of the server-side remote management DB 2100. The information collection unit 211 stores the downloaded contents of the server-side remote management DB 2100 to the control apparatus storage unit 220 as the vehicle-side remote management DB 221.

[1-4-3-2. Transmission Control Unit]

When a control command is received from the mobile terminal 3 via the vehicle near field communication unit 230, the transmission control unit 212 transmits the received control command to the control ECU 800 that corresponds to the control target data included in the control command via the control apparatus bus communication unit 250. That is, when the control target data included in the received control command indicates the car air conditioner 300A, the transmission control unit 212 transmits the control command to the air conditioner ECU 300. Further, when the control target data included in the received control command indicates the storage cell 400A, the transmission control unit 212 transmits the control command to the charging ECU 400.

When the control command is received from the mobile terminal 3 via the vehicle near field communication unit 230, the transmission control unit 212 acquires a combination of the terminal ID 311 and the vehicle ID 312 included in the control command. Then, the transmission control unit 212 determines whether or not the terminal management information 2102 including the acquired combination is stored in the vehicle-side remote management DB 221. When determining that the terminal management information 2102 including the acquired combination is stored in the vehicle-side remote management DB 221, the transmission control unit 212 transmits the control command received from the mobile terminal 3 to the corresponding control ECU 800 via the control apparatus bus communication unit 250.

Further, when the control command is received from the mobile terminal 3 via the vehicle network communication unit 240, the transmission control unit 212 similarly transmits the received control command to the control ECU 800 that corresponds to the control target data included in the control command via the control apparatus bus communication unit 250.

Further, when the control command is received from the application execution apparatus 600 via the control apparatus bus communication unit 250, the transmission control unit 212 similarly transmits the control command received via the control apparatus bus communication unit 250 to the ECU that corresponds to the control target data included in the control command.

Further, in a case to be described later, the transmission control unit 212 transmits the received control commands to the control ECU 800 that corresponds to the control target data included in the control commands in order according to a priority order shown in the priority order data 222 stored in the control apparatus storage unit 220.

[1-4-3-3. Control Command Detection Unit]

The control command detection unit 213 detects whether or not the vehicle control apparatus 200 has received a plurality of control commands within a prescribed time. Note here that the prescribed time indicates the time where the controls may conflict when a plurality of control commands for the same control target are received and those received control commands are processed. The prescribed time is appropriately defined according to a test, a simulation, and the like conducted in advance.

[1-4-4. Air Conditioner ECU]

The air conditioner ECU 300 is an ECU to which the car air conditioner 300A is connected and which controls the actions of the connected car air conditioner 300A according to the control commands to be received.

[1-4-5. Charging ECU]

The charging ECU 400 is an ECU to which the storage cell 400A is connected and which controls the charging actions of the connected storage cell 400A according to the control commands to be received.

[1-5. Actions of Vehicle Control Apparatus]

Next, actions of the vehicle control system 100A will be described.

Figure 6:
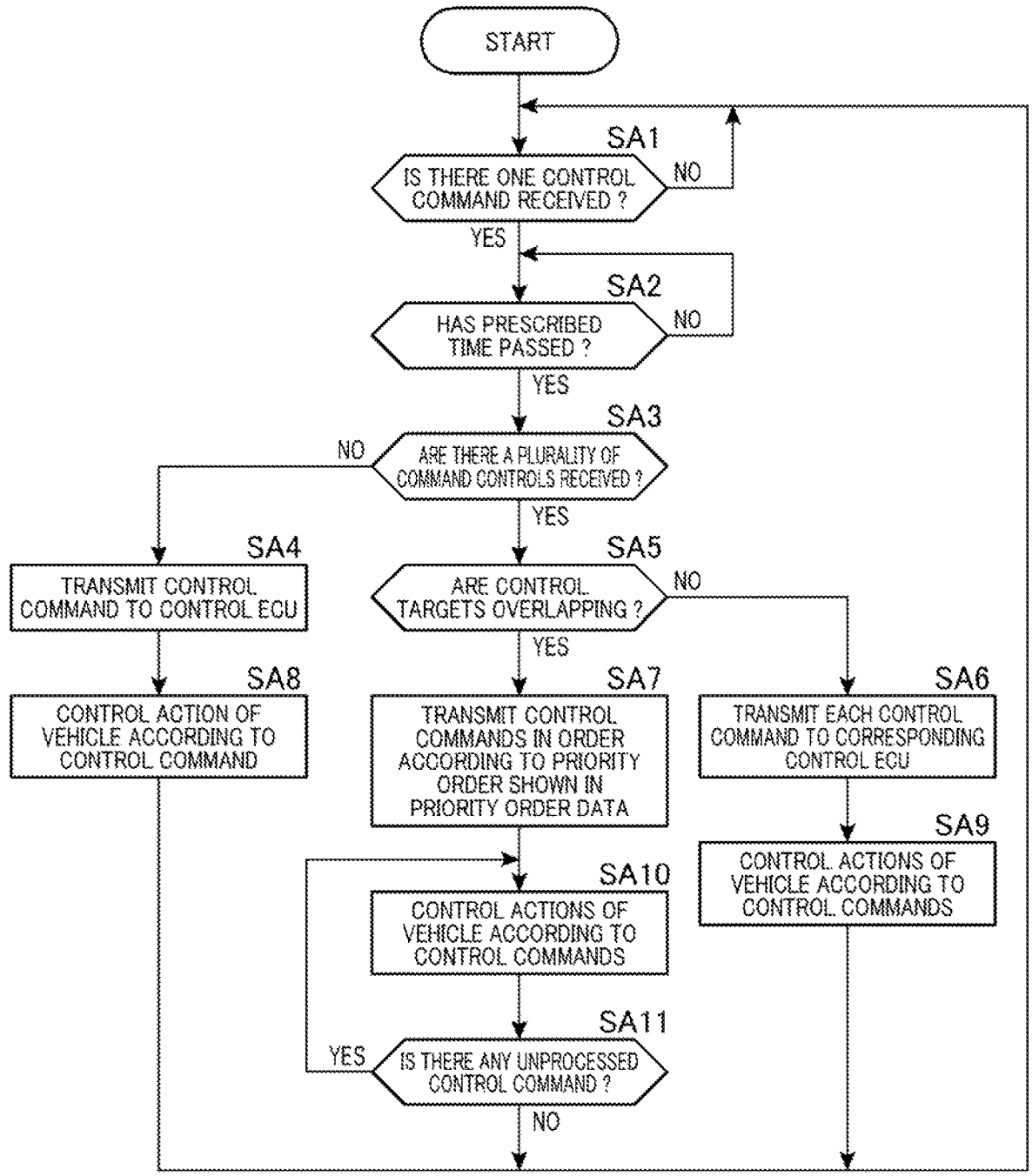
FIG. 6 is a flowchart showing actions of a vehicle control apparatus.

FIG. 6 is a flowchart showing the actions of the vehicle control system 100A.

In FIG. 6, the power source of the vehicle 1 is on, for example, and the vehicle 1 is in a state capable of executing the action of the car air conditioner 300A and the charging action for the storage cell 400A.

The control command detection unit 213 of the vehicle control apparatus 200 determines whether or not a single control command is received via one of the vehicle near field communication unit 230, the vehicle network communication unit 240, and the control apparatus bus communication unit 250 (step SA1).

When determining that no control command is received (NO in step SA1), the control command detection unit 213 executes the processing of step SA1 again.

In the meantime, when determined that a single control command is received (YES in step SA1), the control command detection unit 213 determines whether or not a prescribed time has passed after receiving the single control command (step SA2). As described above, the prescribed time is the time where the controls may conflict when a plurality of control commands for the same control target are received and those received control commands are processed.

When determining that the prescribed time has not passed after receiving the single control command (NO in step SA2), the control command detection unit 213 executes the processing of step SA2 again.

Meanwhile, when determined that the prescribed time has passed after receiving the single control command (YES in step SA2), the control command detection unit 213 detects whether or not a plurality of control commands are received within the prescribed time via at least one of the vehicle near field communication unit 230, the vehicle network communication unit 240, and the control apparatus bus communication unit 250 (step SA3).

When the control command detection unit 213 detects that a plurality of control commands are not received within the prescribed time (NO in step SA3), the transmission control unit 212 transmits the received control command to the control ECU 800 that corresponds to the control target data included in the received control command (step SA4). Then, the control ECU 800 controls the action of the vehicle 1 according to the received control command (step SA8).

That is, when the control target data included in the received control command indicates the car air conditioner 300A, the transmission control unit 212 transmits the control command to the air conditioner ECU 300. Then, the air conditioner ECU 300 controls the action of the car air conditioner 300A according to the received control command. Further, when the control target data included in the received control command indicates the storage cell 400A, the transmission control unit 212 transmits the control command to the charging ECU 400. Then, the charging ECU 400 controls the charging action for the storage cell 400A according to the received control command.

In the meantime, when detecting that a plurality of control commands are received within the prescribed time (YES in step SA3), the control command detection unit 213 determines whether or not the control targets of the plurality of received control commands overlap (step SA5). In step SA5, the control command detection unit 213 determines whether or not the control targets of the plurality of received control commands overlap based on the control target data included in the control commands.

When the control command detection unit 213 detects that the control targets of the plurality of received control commands do not overlap (NO in step SA5), the transmission control unit 212 transmits each of the plurality of control commands to the corresponding control ECUs 800 (step SA6). Then, the corresponding control ECUs 800 control the actions of the vehicle 1 according to the received control commands (step SA9).

For example, it is assumed that the vehicle control apparatus 200 has received a control command for the car air conditioner 300A and a control command for the storage cell 400A within a prescribed time. In this case, the transmission control unit 212 transmits the former control command to the air conditioner ECU 300, and transmits the latter control command to the charging ECU 400. Then, the air conditioner ECU 300 controls the action of the car air conditioner 300A according to the received control command, and the charging ECU 400 controls the charging action for the storage cell 400A according to the received control command.

In the meantime, when the control command detection unit 213 determines that the control targets of the plurality of received control commands overlap (YES in step SA5), the transmission control unit 212 reads out the priority order data 222 from the control apparatus storage unit 220, and transmits the control commands to the corresponding control ECU 800 in order according to the priority order shown in the read priority order data 222 (step SA7).

The control ECU 800 processes the received control commands in the received order to control the actions of the vehicle 1 (step SA10). Then, the control ECU 800 determines whether or not there is any unprocessed command control out of the control commands received from the vehicle control apparatus 200 (step SA11) and when determined that there is (YES in step SA11), executes the processing of step SA10 again. That is, the control ECU 800 processes the unprocessed control commands in the received order. In the meantime, when determined that there is no unprocessed control command (NO in step SA11), the control ECU 800 returns the processing to step SA1.

As described, when the control commands are received from the vehicle control apparatus 200, the control ECU 800 controls the actions of the vehicle 1 by processing the control commands in the received order.

In the embodiment, the priority order shown in the priority order data 222 shows the transmission order of the control commands, in which control commands received by the communication units 270 is defined to be transmitted to the control ECUs 800 with a priority given to the control command received by the communication unit 270 whose communicable distance being away from the vehicle 1 is the longest.

In the embodiment, the communication units 270 capable of receiving the control commands are the vehicle near field communication unit 230, the vehicle network communication unit 240, and the control apparatus bus communication unit 250. The vehicle network communication unit 240 is communicable via the global communication path TK2 established by the global network GN, so that it is the communication unit 270 whose communicable distance being away from the vehicle 1 is the longest among the three communication units 270. The control apparatus bus communication unit 250 communicates via the in-vehicle communication path TK3 established by the in-vehicle network 700, so that it is the communication unit 270 whose communicable distance being away from the vehicle is the shortest among the three communication units 270. The vehicle near field communication unit 230 is capable of having wireless communication with the vehicle 1 without using the global network GB, so that it is the communication unit 270 whose communicable distance being away from the vehicle 1 is shorter than that of the vehicle network communication unit 240 and longer than that of the control apparatus bus communication unit 250.

Therefore, the priority order shown in the priority order data 222 of the embodiment shows the transmission order of the control commands for transmitting the control commands received with a priority order of the control apparatus bus communication unit 250, the vehicle near field communication unit 230, and the vehicle network communication unit 240.

For example, it is assumed that the vehicle control apparatus 200 has received a control command to change the set temperature of the car air conditioner 300A to "25° C." with the vehicle near field communication unit 230 and has received a control command to change the set temperature of the car air conditioner 300A to "26° C." with the control apparatus bus communication unit 250 within a prescribed time. According to the priority order shown in the priority order data 222, the control command received by the vehicle near field communication unit 230 is transmitted with a higher priority to the control ECU 800 than that received by the control apparatus bus communication unit 250. Therefore, in this case, the transmission control unit 212 transmits the control command received by the vehicle near field communication unit 230 to the air conditioner ECU 300, and then transmits the control command received by the control apparatus bus communication unit 250 to the air conditioner ECU 300. Thereby, the air conditioner ECU 300 first changes the set temperature of the car air conditioner 300A to "25° C." and then changes the set temperature to 26° C. Thereby, the set temperature of the car air conditioner 300A is changed to "26° C." at last according to a plurality of control commands received within the prescribed time.

Further, for example, it is assumed that the vehicle control apparatus 200 has received a control command to start charging of the storage cell 400A at "10 am" with the vehicle network communication unit 240 and has received a control command to start charging of the storage cell 400A at "9 am" with the vehicle near field communication unit 230 within a prescribed time. According to the priority order shown in the priority order data 222, the control command received by the vehicle network communication unit 240 is transmitted with a higher priority than that received by the vehicle near field communication unit 230. Therefore, in this case, the transmission control unit 212 transmits the control command received by the vehicle network communication unit 240 to the charging ECU 400, and then transmits the control command received by the vehicle near field communication unit 230 to the charging ECU 400. Thereby, the charging start time of the storage cell 400A is set at 9 am according to a plurality of control commands received within the prescribed time.

As described, when there are a plurality of control commands for the same control target received within a prescribed time, the transmission control unit 212 transmits the control commands to the control ECU 800 in order according to the priority order shown in the priority order data 222. Thereby, the vehicle control apparatus 200 can avoid simultaneous transmission of the control commands to the control ECU 800 with a simple action such as transmitting the plurality of received control commands to the control ECU 800 in order according to the priority order. Therefore, the vehicle control apparatus 200 can avoid conflict in the control of the actions of the car air conditioner 300A and the control of the charging action for the storage cell 400A with a simple action without doing an action for suspending transmission or an action for invalidating a certain control command, an action for notifying that the certain control command is suspended or invalidated, and the like.

Further, the transmission control unit 212 transmits, to the control ECU 800, the control command received by the communication unit 270 with the priority given to the control command received by the communication unit 270 whose communicable distance being away from the vehicle 1 is the longest according to the priority order shown in the priority order data 222. Therefore, among the plurality of control commands received within a prescribed time, the vehicle control apparatus 200 can have the control command transmitted at the position closest from the vehicle 1 to be the control command processed at last by the control ECU 800.

For example, it is assumed that the user 901 shown in FIG. 1 operates the application execution apparatus 600 to transmit a control command to change the set temperature of the car air conditioner 300A to "25° C." to the vehicle control apparatus 200 and, simultaneously, the user 902 shown in FIG. 1 operates the mobile terminal 3A to transmit a control command to change the set temperature of the car air conditioner 300A to "27° C." to the vehicle control apparatus 200. In this case, the control command for changing the set temperature of the car air conditioner 300A to "25° C." transmitted by the operation of the user 901 is reflected upon the vehicle 1 at last.

Further, for example, it is assumed that the user 902 shown in FIG. 1 operates the mobile terminal 3A to transmit a control command to change the set temperature of the car air conditioner 300A to "26° C." to the vehicle control apparatus 200 and, simultaneously, the user 903 shown in FIG. 1 operates the mobile terminal 3B to transmit a control command to change the set temperature of the car air conditioner 300A to "25° C." to the vehicle control apparatus 200. In this case, the control command for changing the set temperature of the car air conditioner 300A to "26° C." transmitted by the operation of the user 902 is reflected upon the vehicle 1 at last.

It is highly probable for the control command transmitted from the position closest from the vehicle 1 to be the control command transmitted by an operation of the user 900 who is using the vehicle 1 or who is about to use the vehicle 1 in the close vicinity. Thereby, the vehicle control apparatus 200 can have the control command transmitted from the position closest from the vehicle 1 as the control command to be processed by the control ECU 800 at last, so that it is possible to reflect the control desired by the user 900 who is highly probable to be using the vehicle 1 or about to use in the close vicinity upon the vehicle 1 at last. Therefore, the vehicle control apparatus 200 can avoid the conflict in the controls and also to enable the user 900 who is using the vehicle 1 or about to use in the close vicinity to use the vehicle 1 without feeling a sense of discomfort.

2. Second Embodiment

[2-1. Configuration of In-Vehicle System]

Next, the second embodiment will be described.

Figure 7:
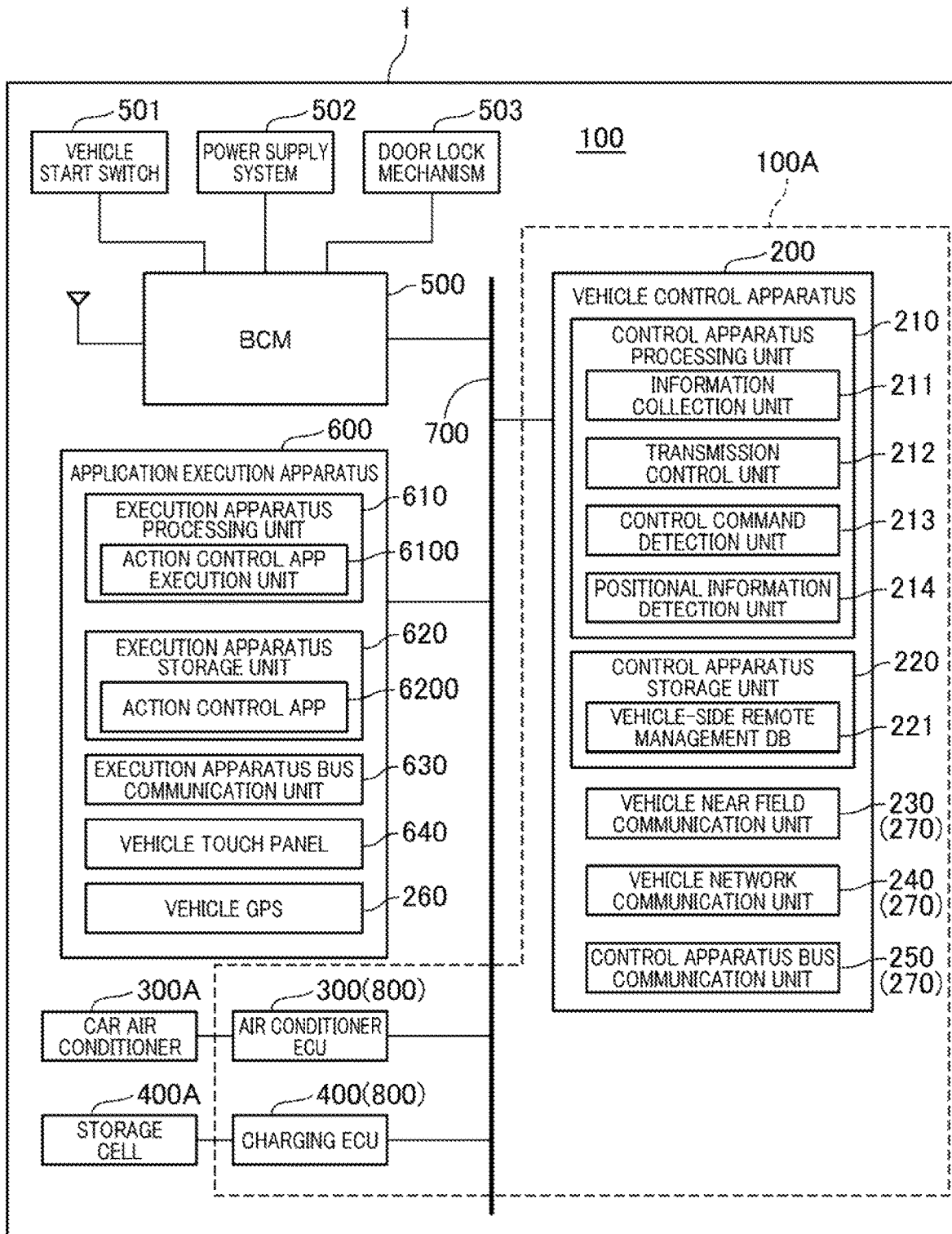
FIG. 7 is a block diagram showing a configuration of an in-vehicle system according to a second embodiment.

FIG. 7 is a block diagram showing the configuration of the in-vehicle system 100 according to the second embodiment.

In the explanation of the second embodiment, same reference signs are applied to the same structural elements as those the in-vehicle system 100 of the first embodiment, and details thereof are omitted.

As it is clear from a comparison with FIG. 5, the application execution apparatus 600 of the in-vehicle system 100 according to the second embodiment includes the vehicle GPS 260. The action control app execution unit 6100 of the second embodiment generates a control command including the vehicle position data outputted from the vehicle GPS 260, and transmits the control command to the vehicle control apparatus 200 by the execution apparatus bus communication unit 630. In the embodiment, the vehicle position data corresponds to "positional information" of the present invention.

Further, as it is clear from a comparison with FIG. 5, the control apparatus storage unit 220 of the vehicle control apparatus 200 of the in-vehicle system 100 according to the second embodiment does not store the priority order data 222. Such configuration not storing the priority order data 222 is employed in order to avoid consumption of an unnecessary memory area, because the second embodiment is not configured like the first embodiment where the control commands are transmitted by having the communication units 270 of different priority degrees defined in advance as the indicators. However, the vehicle control apparatus 200 of the second embodiment may also be configured to store the priority order data 222.

Further, as it is clear from a comparison with FIG. 5, the control apparatus processing unit 210 of the vehicle control apparatus 200 of the in-vehicle system 100 according to the second embodiment further includes a positional information detection unit 214 as a functional element or a functional unit. This functional element is achieved by executing the control program stored in the control apparatus storage unit 220 by the control apparatus processing unit 210 that is a computer.

In the embodiment, the remote app execution unit 3000 of the mobile terminal 3 generates a control command including the terminal position data outputted from the terminal GPS 34, and transmits the generated control command to the vehicle 1 via the global communication path TK2 or the near field communication path TK1. In the embodiment, the terminal position data also corresponds to "positional information" of the present invention. In the following explanation, the vehicle position data and the terminal position data, when not specifically distinguished, are generally termed as "position data" in a simple manner.

When the vehicle near field communication unit 230 or the vehicle network communication unit 240 receives a control command, the positional information detection unit 214 detects the terminal position data included in the control command. Then, the positional information detection unit 214 calculates the distance between the position of the mobile terminal 3 indicated by the terminal position data and the position of the vehicle 1 indicated by the vehicle position data acquired by a prescribed method.

Note that the positional information detection unit 214 may be configured to acquire the vehicle position data from the vehicle GPS 260 that is provided to the application execution apparatus 600 or may be configured to acquire the vehicle position data from the vehicle GPS 260 that is provided to the vehicle control apparatus 200 as in the case of the first embodiment.

Further, when the control apparatus bus communication unit 250 receives a control command, the positional information detection unit 214 detects the vehicle position data included in the control command. Then, the positional information detection unit 214 calculates the distance between the position of the vehicle 1 indicated by the vehicle position data included in the control command and the position of the vehicle 1 indicated by the vehicle position data acquired by a prescribed method. When the control apparatus bus communication unit 250 receives a control command, the positional information detection unit 214 may uniquely determine the distance calculated based on the control command as zero.

[2-1. Actions of Vehicle Control System]

FIG. 8 is a flowchart showing actions of the vehicle control system 100A according to the second embodiment.

Same step numbers as those of the processing in the flowchart of FIG. 6 are applied to those of the processing in the flowchart of FIG. 8, and detailed explanation thereof is omitted.

When the control command detection unit 213 determines that the control targets of a plurality of received control commands overlap (YES in step SA5), the positional information detection unit 214 calculates the distance between the position of the vehicle 1 and the position indicated by the position data included in the control command for each of the plurality of received control commands (step SB1).

Then, the transmission control unit 212 transmits the control commands received by the communication units 270 to the control ECU 800 in order according to the priority order that gives the priority on the control command having the longest distance calculated in step SB1 (step SB2).

For example, it is assumed that the vehicle control apparatus 200 has received a control command to change the set temperature of the car air conditioner 300A to "25° C." with the vehicle near field communication unit 230 and has received a control command to change the set temperature of the car air conditioner 300A to "26° C." with the vehicle network communication unit 240 within a prescribed time. Further, it is assumed that the distance calculated by the positional information detection unit 214 based on the former control command is longer than the distance calculated based on the latter control command. The communicable distance being away from the vehicle 1 is longer with the vehicle network communication unit 240 than the vehicle near field communication unit 230. However, in the embodiment, the transmission control unit 212 transmits the control command received by the vehicle near field communication unit 230 to the air conditioner ECU 300, and then transmits the control command received by the vehicle network communication unit 240 to the air conditioner ECU 300. The air conditioner ECU 300 first changes the set temperature of the car air conditioner 300A to "25° C." and then changes the set temperature to 26° C. Thereby, the control command for changing the set temperature of the car air conditioner 300A to "26° C." is reflected upon the vehicle 1 at last.

As described, in the second embodiment, the positional information detection unit 214 detects the position data included in the control command, and calculates the distance between the position of the vehicle 1 and the position indicated by the detected position data. Then, the transmission control unit 212 transmits, to the control ECU 800, the control commands received by the communication units 270 with a priority given to the communication unit 270 that has received the control command having the longest calculated distance. Thereby, the vehicle control apparatus 200 can transmit the control commands to the control ECU 800 in the priority order based on the actual isolated distances between the apparatuses that have transmitted the control commands and the vehicle 1. Therefore, the vehicle control apparatus 200 can have the control command transmitted from the closest position from the vehicle 1 as the control command to be processed at last with fine precision. This makes it possible to reflect the control desired by the user 900 who is using the vehicle 1 or highly probable to use in the close vicinity upon the vehicle 1 at last. Therefore, the vehicle control apparatus 200 can avoid the conflict in the controls and also to enable the user 900 who is using the vehicle 1 or about to use in the close vicinity to use the vehicle 1 without feeling a sense of discomfort.

3. Other Embodiments

Note that the present invention is not limited to the configurations of each of the embodiments described above but various modes can be employed without departing from the spirit and scope thereof.

For example, in each of the above embodiments, the actions of the car air conditioner 300A and the charging action for the storage cell 400A are presented as the actions of the vehicle 1 and the configurations for controlling those actions by the application execution apparatus 600 or the mobile terminal 3 are described. However, actions of the vehicle 1 that can be controlled by the application execution apparatus 600 or the mobile terminal 3 are not limited to those, and other actions such as actions related to warm-up operations may be controlled as well.

Further, in the above embodiments, for example, the block diagrams shown in FIG. 5 and FIG. 7 are schematic views in which the structural elements are classified according to the main processing contents thereof for making it easier to understand the present invention, and may also be classified into still greater number of structural elements according to the processing contents. Further, a single structural element can also be classified to execute still greater kinds of processing.

Further, the step units of the actions shown in FIG. 6 and FIG. 8, for example, are divided according to the main processing contents thereof for making it easier to understand the actions of the vehicle control apparatus 200, and the present invention is not limited by the way how the processing units are divided or by the names thereof. It is also possible to divide the step units into still greater number of units according to the processing contents. Further, a single step may be divided to include still greater kinds of processing. Further, the order of the steps may be changed as appropriate within the scope not departing from the spirit of the present invention.

4. Summary

As described heretofore, the vehicle control system 100A includes: the vehicle near field communication unit 230 that communicates with the mobile terminal 3A via the near field communication path TK1; the vehicle network communication unit 240 that communicates with the mobile terminal 3B via the global communication path TK2; the control ECU 800 for controlling the actions of the vehicle 1; the transmission control unit 212 that transmits the control commands received by the vehicle near field communication unit 230 and the vehicle network communication unit 240 to the control ECU 800 that controls the actions of the vehicle 1; and the control command detection unit 213 that detects whether or not there are a plurality of control commands received within a prescribed time. When the control command detection unit 213 detects that there are a plurality of control command received within the prescribed time, the transmission control unit 212 transmits, to the control ECU 800, the control commands in order according to a prescribed priority order. The control ECU 800 processes the control commands received from the transmission control unit 212 in the received order, and controls the actions of the vehicle 1.

With such configuration, when there are a plurality of control commands received from the mobile terminal 3 within a prescribed time, the transmission control unit 212 transmits the control commands to the control ECU 800 in order according to the prescribed priority order. Thereby, the vehicle control apparatus 200 can avoid simultaneous transmission of the control commands to the control ECU 800 with a simple action such as transmitting the plurality of received control commands to the control ECU 800 in order according to the priority order. Therefore, the vehicle control apparatus 200 can avoid conflict in the controls of the actions of the vehicle 1 with a simple action without doing an action for suspending transmission or an action for invalidating a certain control command, an action for notifying that the certain control command is suspended or invalidated, and the like.

Further, the vehicle control system 100A includes the control apparatus bus communication unit 250 that communicates with the application execution apparatus 600 provided in the vehicle 1 via the in-vehicle communication path TK3. The transmission control unit 212 transmits the control commands received by the control apparatus bus communication unit 250 to the control ECU 800 in order according to a prescribed priority order.

With such configuration, when receiving control commands from the mobile terminal 3 and the application execution apparatus 600 within a prescribed time, the transmission control unit 212 transmits the control commands to the control ECU 800 in order according to the prescribed priority order. Thereby, even with the configuration capable of receiving the control commands from the application execution apparatus 600, the vehicle control apparatus 200 can avoid simultaneous transmission of the control commands to the control ECU 800 with a simple action such as transmitting the plurality of received control commands to the control ECU 800 in order according to the priority order. Therefore, even with the configuration capable of receiving the control commands from the application execution apparatus 600, the vehicle control apparatus 200 can avoid conflict in the controls of the actions of the vehicle 1 with a simple action without doing an action for suspending transmission or an action for invalidating a certain control command, an action for notifying that the certain control command is suspended or invalidated, and the like.

Further, the transmission control unit 212 transmits, to the control ECU 800, the control command that is received by the communication unit 270 whose communicable distance from the vehicle 1 is the longest, on a priority basis.

With such configuration, the vehicle control apparatus 200 can have the control command transmitted from the position closest from the vehicle 1 as the control command to be processed at last among the control commands received within a prescribed time. Therefore, the vehicle control apparatus 200 can reflect the control desired by the user 900 who is using the vehicle 1 or highly probable to use in the close vicinity upon the vehicle 1 at last. Thereby, the vehicle control apparatus 200 can avoid the conflict in the controls and also to enable the user 900 who is using the vehicle 1 or about to use in the close vicinity to use the vehicle 1 without feeling a sense of discomfort.

Further, the vehicle control apparatus 200 includes the positional information detection unit 214 that detects the position data included in the control commands. The transmission control unit 212 transmits, to the control ECU 800, the control command having the position data that shows the longest distance with respect to the position of the vehicle 1, on a priority basis.

With such configuration, the vehicle control apparatus 200 can transmit the control commands to the control ECU 800 in the priority order based on the actual isolated distances between the apparatuses transmitted the control commands and the vehicle 1. Therefore, the vehicle control apparatus 200 can have the control command transmitted from the closest position from the vehicle 1 as the control command to be processed at last among the control commands received within a prescribed time with fine precision. This makes the vehicle control apparatus 200 possible to reflect the control desired by the user 900 who is using the vehicle 1 or highly probable to use in the close vicinity upon the vehicle 1 at last with high precision. Therefore, the vehicle control apparatus 200 can avoid the conflict in the controls and also to enable the user 900 who is using the vehicle 1 or about to use in the close vicinity to use the vehicle 1 without feeling a sense of discomfort.

The communication via the near field communication path TK1 is the near field communication. The communication via the global communication path TK2 is the communication via the global network GN. The communication via the in-vehicle communication path TK3 is the communication via the in-vehicle network 700 provided in the vehicle 1.

With such configuration, the transmission control unit 212 can avoid the conflict in the controls of the actions of the vehicle 1 with a simple action even when there are a plurality of control commands received within a prescribed time via the near field communication path TK1, the global communication path TK2, and the in-vehicle communication path TK3.

REFERENCE SIGNS LIST

1 Vehicle
3 Mobile terminal
3A Mobile terminal (first mobile terminal)
3B Mobile terminal (second mobile terminal)
100 In-vehicle system
100A Vehicle control system
200 Vehicle control apparatus
210 Control apparatus processing unit
211 Information collection unit
212 Transmission control unit
213 Control command detection unit
214 Positional information detection unit
220 Control apparatus storage unit
221 Vehicle-side remote management DB
222 Priority order data
230 Vehicle near field communication unit (first communication unit)
240 Vehicle network communication unit (second communication unit)
250 Control apparatus bus communication unit (third communication unit)
260 Vehicle GPS
270 Communication unit
300 Air conditioner ECU (vehicle control unit)
300A Car air conditioner
400 Charging ECU
400A Storage cell
500 BCM
501 Vehicle start switch
502 Power supply system
503 Door lock mechanism
600 Application execution apparatus (display apparatus)
610 Execution apparatus processing unit
620 Execution apparatus storage unit
630 Execution apparatus bus communication unit
640 Vehicle touch panel
700 In-vehicle network
800 Control ECU (vehicle control unit)
6100 Action control app execution unit
6200 Action control app
GN Global network (public network)
TK1 Near field communication path (first communication path)

TK2 Global communication path (second communication path)
TK3 In-vehicle communication path (third communication path)

What is claimed is:

1. A vehicle control system, comprising:
a vehicle near field receiver and transmitter that communicates with a first mobile terminal via a near field communication path by near field communication;
a vehicle network receiver and transmitter that communicates with a second mobile terminal via a global network by a public circuit;
a controller bus communication unit configured with a CAN transceiver that communicates with a display provided in the vehicle via an in-vehicle network provided in the vehicle;
an ECU that controls an action of a vehicle; and
a processor, wherein the processor functions as:
a transmission control unit that transmits control commands received by the vehicle near field receiver and transmitter, the vehicle network receiver and transmitter, and the controller bus communication unit to the ECU; and
a control command detection unit that detects whether there are a plurality of the control commands for a same control target received within a prescribed time, wherein when the control command detection unit detects that a plurality of the control commands are received within the prescribed time, the transmission control unit transmits the control commands to the vehicle control unit in order according to a prescribed priority order, and the vehicle control unit processes the control commands received from the transmission control unit in a received order to control the action of the vehicle.

2. The vehicle control system according to claim 1, wherein the transmission control unit transmits the control commands to the ECU in the order of the controller bus communication unit, the vehicle near field receiver and transmitter, and the vehicle network receiver and transmitter.

3. The vehicle control system according to claim 1, wherein the processor further functions as a positional information detection unit that detects positional information included in the control commands, wherein the transmission control unit transmits, to the vehicle control unit, the control command having the positional information that shows the longest distance with respect to the position of the vehicle, on a priority basis.

* * * * *